United States Patent [19]

Lederman

[11] 3,885,077

[45] May 20, 1975

[54] FLOATABLE RUBBERIZED FABRIC

[75] Inventor: Jack M. Lederman, Akron, Ohio

[73] Assignee: The Goodyear Tire & Rubber Company, Akron, Ohio

[22] Filed: Dec. 8, 1972

[21] Appl. No.: 313,284

[52] U.S. Cl.................................. 428/265; 428/494
[51] Int. Cl............................................ D06m 15/28
[58] Field of Search...... 117/138.8 E, 162; 260/763; 161/242

[56] References Cited

UNITED STATES PATENTS

| 2,629,919 | 3/1953 | Golden | 117/163 X |
| 2,803,560 | 8/1957 | McIntyre et al. | 117/162 X |
| 3,166,608 | 1/1965 | Natta et al. | 260/878 |
| 3,205,093 | 9/1965 | Lynch | 117/138.8 |
| 3,255,030 | 6/1966 | Storti | 117/7 |
| 3,298,034 | 1/1967 | Szegari | 2/168 |
| 3,312,584 | 4/1967 | Charlton et al. | 161/81 |

FOREIGN PATENTS OR APPLICATIONS

| 1,113,056 | 8/1961 | Germany |
| 116,698 | 3/1943 | Australia |

Primary Examiner—P. E. Willis, Jr.
Attorney, Agent, or Firm—F. W. Brunner; J. D. Wolfe

[57] ABSTRACT

A rubberized polypropylene fabric capable of floating on water, said rubberized fabric comprising polypropylene fabric coated with a natural rubber compounded with fillers to give a natural rubber composition having a density of less than 0.99.

1 Claim, No Drawings

FLOATABLE RUBBERIZED FABRIC

This invention relates to a method of making a rubberized fabric capable of floating on the water, and to said fabric.

Fabric has been rubberized at least from the time of Charles Goodyear, or even before Goodyear discovered the vulcanization of rubber. These rubberized fabrics have been used as seals for floating lid type tanks to hold gas and other products. Also, rubberized fabric has been used to seal or to cover water in containers to exclude oxygen from the water. One of the difficulties experienced with the use of rubberized fabric in the seals for these water containers is that the fabric sinks beneath the surface of the water and thus requires considerable force to move the interrelated parts due to the weight of the water on the folded fabric which has sunk beneath the surface of the water.

An object of this invention is to provide a method of preparing a rubberized fabric capable of floating on water.

A rubberized fabric capable of floating on water can be prepared by rubberizing a polypropylene fabric with a special compounded natural rubber composition, said natural rubber composition having a specific gravity of 0.99 or less. The natural rubber composition can be applied to the polypropylene fabric by calendering, dipping or the other well-known coating methods such as spreaders, where the amount of rubberized coating applied to the polypropylene fabric in general may be from approximately 2 to about 50 ounces per square yard of fabric. In general, it is preferred that the amount of rubber composition coated on the fabric be as small as possible in keeping with obtaining the desired range of tensiles, tear and other physical properties required in the rubberized fabric for the use to which it is to be subjected.

The crude natural rubber for use in this composition is preferably compounded on a mill or other compounding apparatus to have sufficient sulfur curative to give an optimum cure, or so-called best cure, at about 275°F. for 30 minutes. Likewise, it is desirable and preferred to utilize in the natural rubber composition sufficient antioxidant and antiozonant that the cured vulcanized rubber composition will pass ASTM D-1149 Test for accelerated ozone cracking of vulcanized rubber. Thus it is preferred that the vulcanized natural rubber compound show no cracking after 12 hours at 104°F. in 50 parts per hundred million of ozone. Likewise, it is desirable to add filler to the natural rubber composition as this permits the composition to be colored and to have built in certain desirable aspects to enhance the life and the utility of the rubberized fabric. In general, it is critical that the amount of filler be less than that amount to give the rubber composition a specific gravity of less than 0.99.

The nature of this invention will be more readily understood and its advantages appreciated by reference to the following example, wherein all parts and percentages are by weight unless otherwise specified.

EXAMPLE

The ingredients set forth in Table 1 under Recipe No. 428, 429 and 430 were compounded on a Banbury mill by adding the crude rubber and warming, then adding the ingredients in the normal compounding manner to give an unvulcanized natural rubber composition. This composition was diluted in sufficient naptha to give a cement containing 5 to 20 percent solids, and this cement was used to spread coat polypropylene plain weave fabric, i.e., Hercules spun polypropylene cloth type 58 to give a rubberized composition on the fabric of about 40 ounces per square yard. The rubberized fabric was then rolled into a roll with a polyethylene liner and placed in an autoclave and cured for 30 to 60 minutes at 250° to 300°F. This fabric was removed from the autoclave and sections one foot by one foot were placed in a tank of water and were still floating after 30 days.

Table 1

| Recipe No. | 428 | 429 | 430 |
| --- | --- | --- | --- |
| Crude natural rubber | 100 | 100 | 100 |
| Sulfur | 2.50 | 2.50 | 2.50 |
| Zinc oxide | 2.50 | 2.50 | 2.50 |
| Magnesium carbonate | 5.00 | 3.00 | 3.00 |
| Titanium oxide | .67 | — | — |
| Carbon black fine thermal | — | 2.00 | 2.00 |
| Stearic Acid | 1.0 | 1.00 | 1.00 |
| Butylated paracresol | 10 | — | — |
| Styrenated phenol | — | 1.00 | 1.00 |
| Dialkyl phenylene diamine | — | 1.00 | 1.00 |
| Paraffin wax, M.P. 140–5°F. | — | — | 1.50 |
| Microcrystalline wax | — | — | 1.50 |
| N-Cyclohexyl-2-benzothiazyl sulfenamide | 1.25 | 1.25 | 1.25 |
| Cured Physicals — 60 minutes at 275°F. | | | |
| Specific Gravity* | 0.979 | 0.974 | 0.972 |
| Hardness Shore A | 44 | 43 | 42 |
| 300% elongation | 493 | 435 | 406 |
| Tensile | 3665 | 3655 | 3481 |

*Determined by ASTM D-297 Hydrostatic Method

The fillers useful in this invention are the carbon blacks, metal oxides and carbonates such as zinc oxide, magnesium oxide or carbonate, titanium carbonate, the metal silicates such as calcium, magnesium and aluminum silicates, the fluffy silicas such as Cab-O-Sil or Hi-Sil. Usually at 1 to 8 parts of filler per 100 parts of natural rubber can be used but never more filler can be used than an amount which gives the natural rubber a specific gravity greater than 0.99. Preferably, the specific gravity should be no greater than 0.975.

The sulfur curatives utilizable in this invention can vary from as low as 0.2 to 5 parts of sulfur or sulfur donor materials per hundred parts of natural rubber. The sulfur donor materials and accelerators are well known and described in the *Vanderbilt Rubber Handbook*, 1968 Edition, R. T. Vanderbilt Company. The antioxidants and antiozonants useful in this invention are listed and described in particular detail in E. I. duPont de Nemours And Co. (Inc.) Bulletin-SDA-54456, entitled "Chemicals for Elastomers-Anti-oxidants and Antiozonants."

Although any of the various polypropylene fabrics can be used, the plain weave, twill weave, satin weave, basket weave and leno weave are preferred.

While certain representative embodiments and details have been shown for the purpose of illustrating the invention, it will be apparent to those skilled in this art that various changes and modifications may be made therein without departing from the spirit or scope of the invention.

What is claimed is:

1. A rubberized fabric capable of floating on water consisting essentially of a polypropylene fabric with a coating of a vulcanized natural rubber composition thereon, said rubber composition having a specific gravity no greater than 0.99 and being comprised of natural rubber, sulfur curative, and filler.

* * * * *